United States Patent Office 3,420,887
Patented Jan. 7, 1969

3,420,887
DEHYDROGENATION OF ALCOHOLS TO KETONES
Charles R. Noddings and Andrew J. Dietzler, Midland, Mich., assignors to The Dow Chemical Company, Midland, Mich., a corporation of Delaware
No Drawing. Filed Aug. 14, 1964, Ser. No. 389,765
U.S. Cl. 260—596                    8 Claims
Int. Cl. C07c 45/16

ABSTRACT OF THE DISCLOSURE

Monohydric primary or secondary aliphatic alcohols including the cycloaliphatic alcohols are dehydrogenated to the corresponding aldehyde or ketone over a non-acidically precipitated calcium nickel phosphate material containing 7.5 to 9.2 atoms of calcium per atom of nickel at temperatures between 300° and 600° optionally in the presence of steam.

---

This invention concerns an improved process for the vapor phase dehydrogenation of monohydric aliphatic alcohols to form the corresponding aldehydes and ketones. It pertains especially to the dehydrogenation of secondary butyl alcohol to methyl ethyl ketone.

It is known from prior art that ketones and aldehydes can be produced by the direct vapor phase catalytic dehydrogenation of the corresponding alcohols. Copper, brass, cerium oxide, zinc oxide, chromium oxide and other metals and metallic oxides are listed as catalysts for the dehydrogenation of alcohols in Beamer U.S. Patent No. 2,179,488. There have been improvements in the art subsequent to the Beamer patent; however, the same basic catalysts have been used and are subject to one or more of the following disabilities: (1) short life, (2) undesirable byproducts, (3) inability to operate with high concentrations of water in the feed.

We have found that a catalyst unrelated to the previously used metal or metallic oxide catalysts is effective in the conversion of alcohols to ketones and aldehydes.

It is our discovery that non-acidically precipitated calcium nickel phosphate containing between 7.5 and 9.2 atoms of calcium per atom of nickel is effective in dehydrogenating an alcohol selected from the group consisting of monohydric, primary and secondary, aliphatic alcohols having from 2 to 10, and preferably 2 to 8, carbon atoms per molecule, cyclopentanols and cyclohexanols to form the corresponding aldehydes and ketones when such compounds with or without water are brought in contact with the calcium nickel phosphate at elevated temperatures.

The calcium nickel phosphate with which the invention is concerned, and methods of making the same, are described in U.S. Patents Nos. 2,456,367, 2,456,368 and 2,542,813. It comprises a calcium nickel phosphate containing an average of from 7.5 to 9.2 atoms of calcium per atom of nickel, the total amount of calcium and nickel being sufficient to satisfy the valences of the phosphate radical. The calcium nickel phosphate is precipitated from a neutral to basic aqueous medium. It is washed and dried and can be used directly in such a form as a dehydrogenation catalyst; however, it is usually pressed into the form of pellets for more convenient use. Frequently a minor amount of chromium oxide is admixed with the calcium nickel phosphate, e.g. prior to, or during, formation of the pellets. The catalyst thus may consist of the calcium nickel phosphate, or may comprise the calcium nickel phosphate and a minor amount (less than 50 percent) of chromium oxide. For convenience all such catalysts are herein referred to as "calcium nickel phosphate."

Calcium nickel phosphate is effective in the dehydrogenation of alcohols over wide ranges of space velocity, temperature, water diluent and cyclical regeneration time. Percent conversion and percent selectivity are high. As they are used herein "percent selectivity" is 100 multiplied by the moles of ketone or aldehyde produced divided by the moles alcohol converted "percent conversion" is 100 multiplied by the moles of alcohol converted divided by the moles of alcohol in the feed; "percent yield" is 100 multiplied by the moles of ketone or aldehyde produced divided by the moles of alcohol in the feed; "steam ratio" is moles of water per mole of alcohol in the feed; and "space velocity" is the volume of gas at standard conditions passing through the catalyst bed per hour divided by the volume of the bed.

The present process, in its preferred embodiment, consists of passing an alcohol and water mixture in a vapor state through a bed of calcium nickel phosphate at temperatures between 300 and 600° C. and preferably between 350 and 500° C. The process is normally cyclical, that is, the feed is periodically interrupted and air, or a mixture of air and steam is passed through the bed to regenerate the catalyst, e.g. for a period equivalent to from 10 percent to 100 percent of the reaction period. The regeneration step oxidizes and removes carbonaceous deposits that accumulate in the catalyst bed. The length of a complete cycle (process plus regeneration) has been varied between 30 minutes and 2 hours and normally approximately half the cycle is used for regeneration. However regeneration periods of only 25 percent of the complete cycle were found to be effective in maintaining catalyst activity and selectivity for alcohol dehydrogenation. It thus may be possible, for operations of brief duration, to run with no regeneration.

The optimum reaction conditions are somewhat dependent on the specific alcohol being dehydrogenated. For example, in the dehydrogenation of secondary butyl alcohol to methyl ethyl ketone experience has indicated that the optimum temperature range is between 400 and 450° C.; however, the process gives significant conversions to the desired product over wide temperature ranges, e.g. 300° to 600° C.

The alcohol space velocity used may vary over wide ranges, e.g. 150 to 1000, and percent conversion and percent selectivity will remain at high levels. Optimum space velocities depend upon the temperature, type of alcohol and steam ratios.

In the range of very high steam ratios, e.g. 15–40, there is no pronounced effect on the percent selectivity of the reaction, however, the percent conversion increases with decreasing steam ratio. At low steam ratios, e.g. 0–5, there is a strong direct relationship between steam ratio and percent selectivity. The process can operate without steam, i.e. a completely dry feed, but in general the percent selectivity of the catalyst is erratic and lower under this condition. A steam ratio of one or two to one is usually necessary to maintain stability. At steam ratios greater than two, the catalyst shows no substantial decrease in percent selectivity or percent conversion after one month's operation.

Secondary aliphatic alcohols dehydrogenate to form ketones very readily using this process. The percent selectivity is somewhat dependent on the chain length of the alcohol. Substantially all of the non-selective product is the olefin corresponding to the starting alcohol. A small amount (less than one percent of the converted alcohol) is cracked and an even smaller amount appears as other impurities.

Unsaturated aliphatic alcohols dehydrogenate to form the ketone under conditions substantially the same as those used for saturated secondary alcohols.

Alicyclic secondary alcohols react at levels of percent selectivity and percent conversion similar to those of straight chain secondary alcohols.

Under similar conditions primary aliphatic alcohols react (to form aldehydes) considerably slower than secondary alcohols. The percent conversion can be increased by raising the reaction temperature with some sacrifice of the percent selectivity. Primary alcohol percent conversion decreases markedly with increasing chain length.

The following examples illustrate but do not limit the invention:

Example I

A pelleted dehydrogenation catalyst (consisting essentially of an intimate mixture of 2 percent by weight of chromic oxide and 98 percent of calcium nickel phosphate containing an average of approximately 8.5 atoms of calcium per atom of nickel) was used. A bed of the catalyst was flushed free of air with steam after which the constant cyclical operation of one hour on stream and half an hour on regeneration was begun. Products from the reaction were obtained from a series of three different points: a trap cooled with ice containing unreacted alcohol, water and the carbonyl or aldehyde compound; a trap cooled with solid $CO_2$ containing predominantly the olefins formed by dehydration; and a wet test meter measuring uncondensible gases which are hydrogen and some degradation products. The regular ice trap products were analyzed by vapor phase chromatography, in some cases with the aid of analytical distillation. The solid $CO_2$ trap products were analyzed by vapor phase chromatography, and the uncondensible gases were analyzed by mass spectroscopy. A single experiment consisted of 5 cycles and gave in general good material balance. The following tabulation is for the 5 cycle composites. Regeneration air was held at a space velocity of 400 and regeneration steam was held at a space velocity of 800. Typical results are as follows.

Conditions:
    sec.-Butyl alcohol space velocity _____ 200
    Reaction temperature _____ °C__ 425
    Steam ratio _____ 25:1

| Experiment | Gram moles alcohol fed | Percent conversion | Percent selectivity | Percent of converted alcohol to butenes | Percent of converted alcohol to other products |
|---|---|---|---|---|---|
| 1 | 6.56 | 95.4 | 94.7 | 4.7 | .6 |
| 2 | 6.59 | 95.2 | 95.5 | 4.1 | .4 |
| 3 | 6.39 | 96.5 | 94.6 | 5.1 | .3 |
| 4 | 6.68 | 97.0 | 94.3 | 5.3 | .4 |

Example II

Substantially the same catalyst, procedure and apparatus were used as in Example I except that total cycle time was ½ hour, 15 minutes on process, 15 minutes on regeneration, and regeneration air was held at a space velocity of 700 and regeneration steam was held at a space velocity of 3000. The temperature was varied to determine the most suitable range for the methyl ethyl ketone production. The following results are typical. They are five cycle composites.

Conditions:
    Secondary butyl alcohol space velocity _____ 400
    Steam ratio _____ 20

| Temperature (° C.) | Percent yield | Percent selectivity |
|---|---|---|
| 325 | 35.0 | 100 |
| 375 | 78.4 | 100 |
| 400 | 96.8 | 100 |
| 425 | 94.1 | 99.2 |
| 450 | 96.6 | 98.8 |
| 500 | 89.4 | 94.4 |
| 550 | 84.4 | 88.0 |
| 600 | 78.0 | 82.1 |

Example III

Substantially the same catalyst, procedure and apparatus were used as in Example I. Various alcohols were dehydrogenated to the corresponding ketone or aldehyde at reaction conditions. The results are five cycle composites.

Conditions:
    Alcohol space velocity, 200.
    Temperature, 425° C. unless otherwise indicated.
    Feed, alcohol and steam.

| Alcohol | Product | Steam ratio | Percent conversion | Percent selectivity |
|---|---|---|---|---|
| 1-propanol | 1-propanal | 12.5 | 38.4 | 92.2 |
| Do [1] | do | 12.5 | 60.3 | 86.1 |
| Do [2] | do | 12.5 | 86.5 | 85.8 |
| Do [1] | do | 25.0 | 31.8 | 93.6 |
| 1-butanol | 1-butanal | 23.7 | 30.95 | 93.0 |
| 2-methylpropanol | 2-methylpropanal | 25.2 | 28.4 | 91.0 |
| 2-propanol | 2-propanone | 25.0 | 96.4 | 95.8 |
| Octanol-2 | Octanone-2 | 12.6 | 93.0 | 67.0 |
| Ethanol | Acetaldehyde | 25.0 | 34.4 | 94.2 |
| n-Heptanol | n-Heptanal | 21.5 | 19.5 | 87.8 |
| Cyclohexanol | Cyclohexanone | 25.0 | 97.0 | 85.0 |
| 2-methylcyclohexanol-1 | 2-methylcyclohexanone-1 | 25.0 | 95.0 | 80.0 |

[1] 450° C.  [2] 475° C.

Example IV

Substantially the same catalyst, procedure and apparatus were used as in Example I. The first 13 tests were run with cycle times and regeneration conditions similar to Example II. The last 4 tests were run with a regeneration air space velocity of 150 and a regeneration steam space velocity of 1000 and 1.5 hour cycle time (1 hour on reaction, .5 on regeneration). The variables of steam ratio and alcohol space velocity were explored. Each test is a 5 cycle composite.

FEED: SECONDARY BUTYL ALCOHOL AND STEAM

| Test | Temp., ° C. | Steam ratio | Alcohol space velocity | Percent conversion | Percent selectivity |
|---|---|---|---|---|---|
| 1 | 350 | 20 | 150 | 89.2 | 99.7 |
| 2 | 350 | 20 | 300 | 53.3 | 100 |
| 3 | 350 | 20 | 400 | 48.0 | 100 |
| 4 | 450 | 40 | 400 | 92.2 | 98.0 |
| 5 | 450 | 40 | 400 | 90.9 | 98.3 |
| 6 | 450 | 30 | 400 | 95.6 | 98.4 |
| 7 | 450 | 30 | 400 | 96.6 | 97.9 |
| 8 | 450 | 20 | 400 | 96.9 | 98.0 |
| 9 | 450 | 20 | 400 | 97.6 | 97.9 |
| 10 | 450 | 10 | 400 | 98.2 | 98.0 |
| 11 | 450 | 10 | 400 | 98.2 | 98.0 |
| 12 | 450 | 5 | 400 | 98.6 | 95.8 |
| 13 | 450 | 5 | 400 | 99.1 | 96.3 |
| 14 | 440 | 0 | 400 | 85.4 | 78.5 |
| 15 | 405 | 0 | 600 | 78.5 | 91.0 |
| 16 | 420 | 0 | 800 | 67.2 | 83.4 |
| 17 | 420 | 0 | 1,000 | 43.3 | 88.9 |

We claim:
1. The method which comprises dehydrogenating an alcohol selected from the group consisting of monohydric, primary and secondary, aliphatic alcohols having from 2 to 10 carbon atoms per molecule, cyclopentanols and cyclohexanols to produce the corresponding ketones and aldehydes by bringing the alcohol at a temperature between 300° and 600° C. into contact with a catalyst consisting essentially of neutrally to basically precipitated calcium nickel phosphate containing an average of from 7.5 to 9.2 atoms of calcium per atom of nickel, the total amount of calcium and nickel being sufficient to satisfy the valences of the phosphate radical said catalyst being formed in a non-acidic aqueous medium prepared by mixing a solution of a soluble salt of calcium and nickel with a solution of a soluble orthophosphate and precipitating said metal phosphate catalytic material from the mixture at a pH of from about 7 to 9.

2. The method which comprises dehydrogenating an alcohol selected from the group consisting of monohydric, primary and secondary, saturated aliphatic alcohols having from 2 to 8 carbon atoms per molecule, cyclopentanols and cyclohexanols to produce the corresponding ketones and aldehydes by bringing the alcohol at a temperature between 300° and 600° C. into contact with a catalyst consisting essentially of neutrally to basically precipitated calcium nickel phosphate containing an average of from 7.5 to 9.2 atoms of calcium per atom of nickel, the total amount of calcium and nickel being sufficient to satisfy the valences of the phosphate radical said catalyst being formed in a non-acidic aqueous medium prepared by mixing a solution of a soluble salt of calcium and nickel with a solution of a soluble orthophosphate and precipitating said metal phosphate catalytic material from the mixture at a pH of from about 7 to 9.

3. The method for the production of aldehydes and ketones from alcohols selected from the group consisting of monohydric primary and secondary aliphatic alcohols having from 2 to 10 carbon atoms per molecule, cyclopentanols and cyclohexanols which comprises passing a vapor mixture of the alcohol and steam in a ratio of one mole of alcohol to one to 25 moles of steam through a bed of catalyst maintained at a temperature between 300° and 600° C., said catalyst being in the form of pellets consisting essentially of neutrally to basically precipitated calcium nickel phosphate containing an average of from 7.5 to 9.2 atoms of calcium per atom of nickel, the total amount of calcium and nickel being sufficient to satisfy the valences of the phosphate radical said catalyst being formed in a non-acidic aqueous medium prepared by mixing a solution of a soluble salt of calcium and nickel with a solution of a soluble orthophosphate and precipitating said metal phosphate catalytic material from the mixture at a pH of from about 7 to 9.

4. The method as described in claim 3 wherein the alcohol is secondary butyl alcohol.

5. The method as described in claim 3 wherein the flow of alcohols to catalyst bed is periodically interrupted, the bed swept free of hydrocarbons, an oxygen containing mixture is introduced to oxidize and remove carbonaceous accumulations from the bed, and thereafter the flow of the oxygen containing mixture is discontinued, the bed is swept free of oxygen and the alcohol is again introduced with steam into the bed.

6. The method as described in claim 3 wherein the alcohol is secondary butyl alcohol, the reaction temperature is between 375° and 475° C. and the reaction mixture introduced to the bed of catalyst contains between 1 and 10 moles of steam per mole of alcohol.

7. The method as described in claim 3 wherein the catalyst is a mixture of the calcium nickel phosphate and chromium oxide, the chromium oxide being less than 50 percent by weight of the mixture.

8. The method as described in claim 6 wherein the catalyst is in the form of pellets.

References Cited

UNITED STATES PATENTS 2,442,320   5/1948   Button et al. _____ 252—437

FOREIGN PATENTS 919,440   2/1963   Great Britain.
930,300   7/1963   Great Britain.

LEON ZITVER, *Primary Examiner.*

M. JACOB, *Assistant Examiner.*

U.S. Cl. X.R.

260—586, 603; 252—437